(12) United States Patent
Choudhury et al.

(10) Patent No.: US 7,099,329 B1
(45) Date of Patent: Aug. 29, 2006

(54) METHOD FOR PREVENTING OVERLOAD CONDITION IN A CIRCUIT SWITCHED ARRANGEMENT

(75) Inventors: Gagan L. Choudhury, Marlboro, NJ (US); Vaidyanathan Ramaswami, Neshanic Station, NJ (US)

(73) Assignee: AT&T Corp., New York, NY (US)

( * ) Notice: Subject to any disclaimer, the term of this patent is extended or adjusted under 35 U.S.C. 154(b) by 1003 days.

(21) Appl. No.: 10/026,079

(22) Filed: Dec. 22, 2001

Related U.S. Application Data

(60) Provisional application No. 60/324,760, filed on Sep. 25, 2001, provisional application No. 60/299,832, filed on Jun. 21, 2001, provisional application No. 60/299,836, filed on Jun. 21, 2001, provisional application No. 60/299,860, filed on Jun. 21, 2001.

(51) Int. Cl.
*H04L 12/56* (2006.01)

(52) U.S. Cl. .................................... 370/395.2

(58) Field of Classification Search ............... 370/468, 370/401, 351, 352, 461, 462, 522, 524, 229, 370/230, 231, 232, 233, 234, 235; 340/825.5, 340/825.51; 379/406.01, 399.1, 221.03, 379/112.01, 112.04, 229, 230
See application file for complete search history.

(56) References Cited

U.S. PATENT DOCUMENTS

| 5,570,355 A | * | 10/1996 | Dail et al. ................. 370/352 |
| 6,404,887 B1 | * | 6/2002 | Born et al. ............ 379/406.04 |
| 6,731,740 B1 | * | 5/2004 | Choudhury et al. ... 379/221.03 |
| 6,826,273 B1 | * | 11/2004 | Kaplan et al. ......... 379/221.03 |

* cited by examiner

*Primary Examiner*—Dang Ton
(74) *Attorney, Agent, or Firm*—Henry T. Brendzel

(57) ABSTRACT

An arrangement where connections between a terminal and a switch are effected through a serial connection of shared, overloadable, resources, and where conventionally each of the resources has a given number of communication channels, provides for effective congestion control by converting one or more of the communications channels to one or more groups of enhanced signaling channels. The congestion control is effected by employing the enhanced signaling channels, which can carry audible signals, to determine whether to set up requested calls, based on a preselected congestion control process.

35 Claims, 5 Drawing Sheets

C — TOTAL CAPACITY
$K_V$ — RESERVED NUMBER OF VOICE CONNECTION CHANNELS
$N_{DATA}$ — NUMBER OF SERVICED DATA CONNECTIONS
$N_V$ — NUMBER OF SERVICED VOICE CONNECTIONS

METHOD FOR PREVENTING OVERLOAD CONDITION IN A CIRCUIT SWITCHED ARRANGEMENT

RELATED APPLICATION

This application is related to provisional applications numbered 60/299,832, 60/299,836, and 60/299,860, filed Jun. 21, 2001, and to provisional application No. 60/324,760, filed Sep. 25, 2001.

BACKGROUND OF THE INVENTION

This invention relates to a method for preventing, or mitigating the effects of, an overload condition in a circuit switched telecommunication network. In some embodiments, such a network includes one or more arrangements where a group of client terminals are statistically multiplexed onto one or more transmission paths, the signals of active ones of the terminals are brought to a head end terminal (HET), and those signals are then communicated from the head end terminal to a central office switch of the network (henceforth, near-end office) over a shared transmission path. By statistically multiplexing of terminals onto the transmission paths it is meant that the transmission paths do not have sufficient capacity to service all terminals simultaneously. One example of such an arrangement is a network that employs a digital (subscriber) loop carrier system. Another example is a network that provides circuit switched telephony over hybrid-fiber coax (HFC). Still another example is a network where HET 20 is a PBX. In this example, however, terminals that are connected to the PBX are not employing a shared transmission resource in order to reach the PBX. Closely related to the above are arrangements that employ central office switch concentrators. In the context of this disclosure, therefore, a concentrator at the ingress of a near-end switch is considered to be a head end terminal.

In all such arrangements there exists an element that concentrates traffic from numerous client terminals onto a transmission path, but that path is capable of providing simultaneous service to only a fraction of the client terminals. Normally this is acceptable because not all client terminals are likely to need service at the same time, and the shared transmission path is engineered to have sufficient capacity to insure that the probability of a client terminal being denied service because the transmission path is full is below a chosen, specific, level.

One aspect of such prior art arrangements is that the near-end office provides the basic functions needed to establish connections, such as dial tone, digit detection, etc. Employing the dial tone generation and digit detection circuitry of the near-end office simplifies the architecture and reduces cost by avoiding duplication of features both at the HET and the near-end office. The disadvantage of this arrangement, however, is that when circuits in the shared transmission path are congested, new callers cannot connect to the near-end office and, therefore, do not even get a dial tone. Consequently, dialing digits are not transmitted by client terminals (or, if transmitted, are not received) and that leads to difficulty in implementing intelligent admission controls. This condition, unfortunately, has been observed more and more in practice because, with the increased popularity of the Internet, more computers utilize the network, and computers connected to the Internet often have holding times (the time intervals between off-hook and on-hook) that are much longer than those that were expected when the shared transmission path were originally engineered.

The above describes one source by which congestion can occur at, or prior to, the near-end office. However, even in network arrangements that do not have a shared transmission path between client terminals and the switch at the near-end office (near-end switch, for short), congestion can occur, simply because of an extraordinary use of the near-end switch in response to some event, such a radio "call-in" contest. That can occurs of course, when components of that near-end switch that are shared, such as a concentrator or a digit collector, become overloaded. It might also be caused by a large number of computer users whose computers automatically keep redialing a busy Internet Service Provider (ISP) modem bank in an effort to obtain a modem the moment one becomes free.

The central network (i.e., the network core excluding the near-end offices and their connections to users) is often protected from some of these overload conditions by means of a "choke" network. This is typically implemented with a limited number of trunks that are set up in a trunk group specifically for a "call-in" contest telephone number. Once these trunks are busy, the switch returns a re-order tone (fast busy) to any additional user attempting to access the "call-in" number. This protects the central switches from dealing with a large number of calls to a number that is almost certainly busy, and allows normal use of the core network. The end offices themselves are, however, not protected from rapid retries, except in the sense that a user is likely to give up after a few busy signals. Alas, the likelihood of giving up quickly has shrunk in recent years because many telephones have redial buttons (and computers have modem software that has redial options) which permit redialing with a very small effort on the part of the user. Moreover, the re-tries have become more closely spaced in time.

SUMMARY

Congestion problems in prior art networks are alleviated, and an advance in the art is achieved, with an arrangement that includes a number of signaling channels, over and above existing out-of-band signaling channels, that are used for congestion control. In one illustrative embodiment, where connections between a terminal and a switch are effected through a serial connection of shared, overloadable, resources, and conventionally each of the resources has a given number of communication channels, the improved arrangement converts one or more of the communications channels to one or more groups of enhanced signaling channels. With such an improved arrangement, congestion control is effected by employing the enhanced signaling channels, which can carry audible signals, to determine whether to set up requested calls, based on a preselected congestion control process.

DETAILED DESCRIPTION

Figure 1:
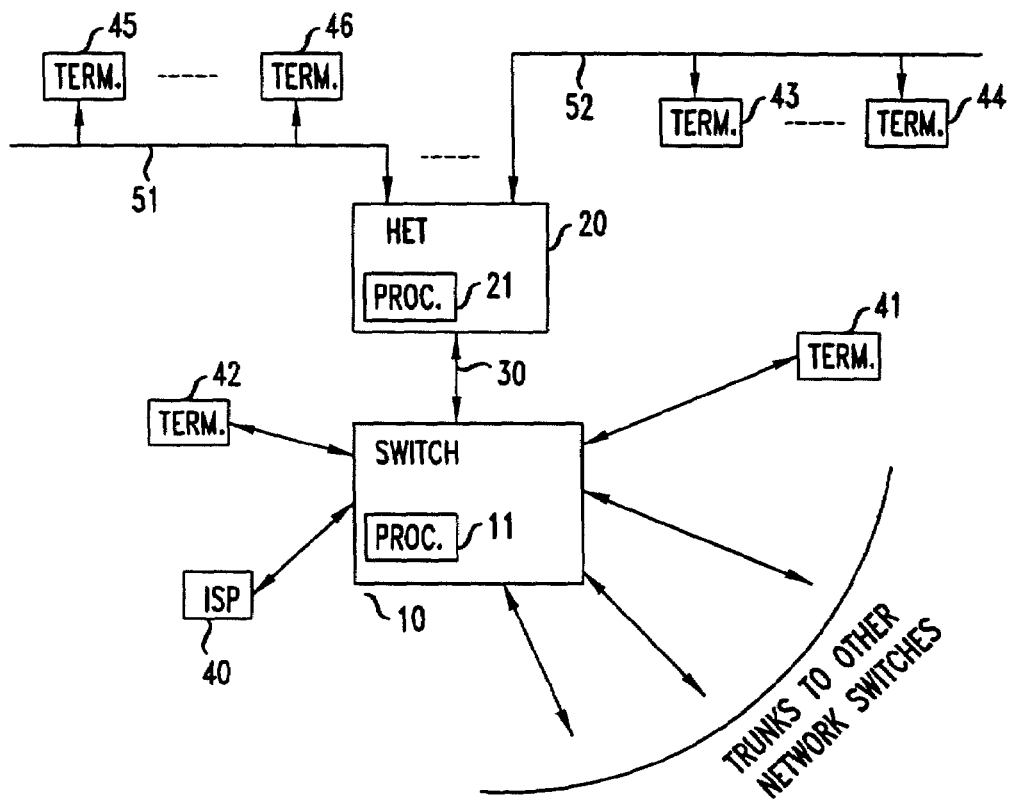
FIG. 1 illustrates a physical arrangement of a network switch that is coupled to terminals directly, as well as indirectly, through a head end terminal.

FIG. 1 presents a diagram of an illustrative arrangement where the principles disclosed herein can be practiced. In includes switch 10 (with processor 11), which is a near-end switch of a network that, on the trunk side, is connected to other switches of the network. Terminals 41 and 42 are connected directly to switch 10, as well as ISP 40. Additionally, shared path 30 connects HET 20 to switch 10. HET 20 includes a processor 21 that performs all of the processing needed in HET 20. Terminals 45–46 are connected to HET 20 via path 51, and terminals 43–44 are connected to HET 20 via path 52. Paths 51 and 52 may be, for example, hybrid-fiber coax systems, shared among the terminals. Henceforth, terminals 43–46 are termed "downstream" terminals, and paths 51 and 52 are termed "downstream" paths. Of course, an arrangement like the one shown in FIG. 1 can have more than two downstream paths. HET 20 concentrates the signals on each of the downstream paths (multiplexing action) and further concentrates the signals of the downstream paths onto shared transmission path 30 (also multiplexing action), and correspondingly demultiplexes signals on their way from shared path 30.

The following discloses a number of methods for protecting the FIG. 1 arrangement from overload.

Method I—Threshold-Based Call Acceptance Scheme

This method protects against transmission path congestion that, without some imposed access controls, can block access to switch 10 to the point that dial tone cannot reach a downstream terminal that seeks to initiate a call. This applies to congestion on paths 51 and 52 as well as to congestion on path 30. Central to this method is the notion that a call can be conceptually divided into an initial "attempt" period and a subsequent "communication" period. During the attempt period, a downstream terminal receives a dial tone from switch 10 and forwards dialed number digits to switch 10. The communication period begins when switch 10 effectively accepts the call by starting to route the call to the dialed number. Necessarily, the method contemplates that at all times, with very high probability, an available (i.e., unoccupied) channel exists on the paths 30 and 51 transmission medium and on the paths 30 and 52 transmission medium, and that a mechanism is provided to assure this.

In accordance with one embodiment of this method, any downstream terminal coupled to path 51 (or coupled to path 52) that wishes to initiate a call is granted one of the available path 51 (or path 52) channels and one of the available path 30 channels, receives a dial tone from switch 10, and proceeds to forward dialed number digits; i.e., engages in a call attempt. Based on the number of occupied channels (on path 30 and the downstream path to which the terminal initiating the call is connected), near-end office 10 decides whether or not to drop a call. The call dropped is a call that uses a channel on path 30 and a channel on one of the downstream paths. The set of calls that are considered for dropping includes all calls in the midst of their communication period as well as all calls in the midst of their attempt period. Some calls, on the other hand, may be exempt from such forced dropping, for example, 911 calls.

The above states categorically that a channel is granted in order to obtain dial tone and to forward dialed number digits to switch 10. However, one cannot guarantee that a channel will be always available to a downstream terminal that seeks to initiate a call, because it is possible that many of the inactive downstream terminals might wish to initiate a call, essentially simultaneously. The best that can be done is to introduce a mechanism that works to maintain a high probability that a channel is always available. Indeed, in accord with the principles of this method, a call control mechanism is employed that works toward insuring that the capacity on path 30 does not fall below a preselected threshold, K1, and that capacity on paths 51 and 52 does not fall below preselected thresholds $L1_{51}$ and $L1_{52}$, respectively. This is accomplished by making two independent component decisions relative to a call attempt by a terminal: one related to path 30, and one related to the downstream path through which the terminal is making the call attempt (e.g., path 51). A call is dropped when either one of the two decisions is to drop a call. Stated in other words, if a conclusion by a component decision to drop a call is designated by a logical "1", then the final decision of the method is the logical OR function of the two component decision logical values. Of course, by the nature of the OR function, when the first component decision that is made corresponds to logical "1," the second component decision does not need to be undertaken.

One embodiment of this mechanism (algorithm) employs two threshold values, for example, K2 and K1 in connection with path 30. When remaining capacity is larger than K1, no calls are dropped; when capacity is between thresholds K1 and K2 (inclusive of K2 and K1), a first algorithm is employed in the decision to drop a call; and when remaining capacity falls below K2, a second algorithm is employed in the decision to drop a call. These algorithms can be deterministic, or probabilistic. An example of a deterministic approach is one where the first algorithm accepts the new call, but drops an existing call, while the second algorithm declines to accept the new call.

Figure 2:
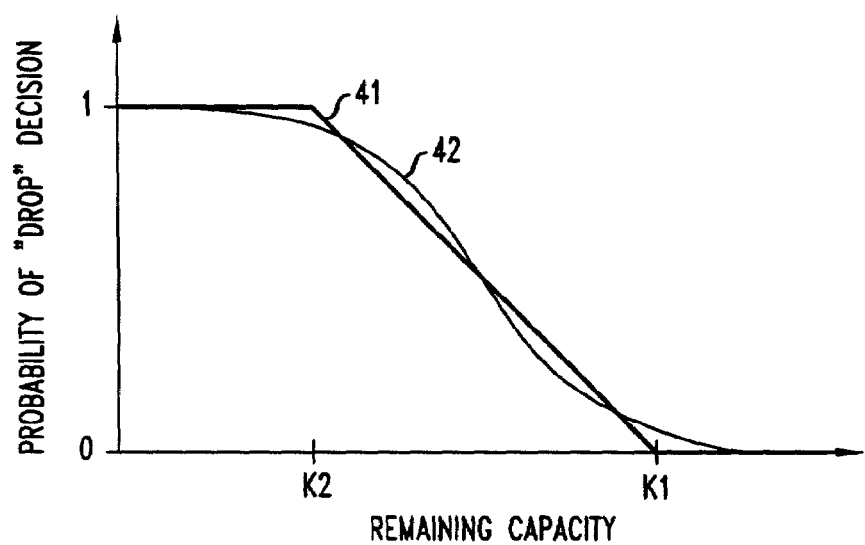
FIG. 2 describes two curves that may be employed in a congestion control method for the FIG. 1 arrangement, which works to assure an always existing capacity for attempting new calls.

FIG. 2 presents a curve 41 that embodies one implementation of the mechanism, which corresponds to a probabilistic approach to the drop/no drop decision. When capacity on path 30 is greater than K1, the probability of a decision to drop a call is zero. When capacity on path 30 is equal to or less than K1 but also equal to or greater than K2, the probability of a decision to drop a call is between zero and 1 and increasing toward 1 as capacity decreases. When remaining capacity on path 30 is less than K2, the probability of a decision to drop a call is one (i.e., a certainty). In may be appreciated that the probability curve between K1 and K2 need not be linear and that, in fact, one can dispense with the explicit thresholds K2 and K1 by employing an appropriately selected probability function, such as the one depicted by curve 42. In practice, however, employing thresholds K2 and K1 results in a lower computational burden. A similar two-threshold scheme may be employed over paths 51 and 52 to control congestion on those paths. Also, the parameters set may be set differently for different paths.

For those instances where a decision to drop a call is made (because either one of the above-mentioned component decisions reaches a decision to drop a call), a selection of the call to be dropped must be made. When a decision to drop results from the component decision that involves path 30 (i.e., involving thresholds K2 and K1), the set of calls from which a call to be dropped is selected comprises all calls on path 30 (those in the midst of their attempt period and those in the midst of the communication period). When a decision to drop results from the component decision that involves a downstream path (for example, involving thresholds $L1_{51}$ and $L2_{51}$ on path 51), the set of calls from which a call to be dropped is selected comprises all calls on the downstream path to which the terminal making the call attempt is connected.

Any chosen decision schema for selecting the particular call to be dropped is permitted, and the following presents a number of such schemas, which can be employed severally, or in combination:

calls involving two or more channels in the resource that triggered the decision to drop a call.
Oldest data call from the set of existing data calls.
Oldest data call from the set of existing data calls, but only if its elapsed holding time is larger than N seconds.
Oldest call of any type.
Oldest call of any type, but only if its elapsed time is larger than N seconds.
A random data call.
A random data call, from the set of calls with elapsed holding time larger than N seconds.
A random call.
A random call, from the set of calls with elapsed holding time larger than N seconds.

A call that finished its attempt period, but waiting to start communication with called party.

A random call in midst of a call attempt. Of course, additional criteria may be added by those skilled in the art. As mentioned above, for example, some calls might be exempted from forced dropping.

It should be understood that the term "data call" as used herein is illustrative of, and encompasses, all calls where persons using the FIG. 1 arrangement do not necessarily expect real-time transmission of information. Conversely, the term "voice call" as used herein is illustrative of, and encompasses, all calls where persons using the FIG. 1 arrangement do expect real-time transmission of information.

To implement the above method in processor 11, the processor needs to know about the available (i.e., remaining, unoccupied) capacity on path 30 and about the available capacities on paths 51 and 52. Switch 10 knows the remaining, unoccupied, capacity on path 30 because the path is coupled directly to processor 11. As for the remaining, unoccupied, capacity on paths 51 and 52, HET 20 must inform processor 11 of the maximum capacity on the downstream paths, if the maximum capacity is alterable, and processor 11 must know which downstream terminals are coupled to which downstream paths. Since a call attempt identifies the downstream terminal that is making the call attempt, it follows that a lookup table in processor 11 associating downstream terminals with downstream paths would do. Alternatively, of course, HET 20 can identify to switch 10 the downstream path from where the call attempt is made, as the attempt is being made.

Further, processor 11 needs to have the ability to drop calls in switch 10 and to cause HET 20 to drop calls and release corresponding channels on the downstream path of the dropped calls. That capability is inherent in the normal operation of the FIG. 1 switch 10 and in the normal switch 10—HET 20 interactions. That is, any signaling interface that is employed between switch 10 and HET 20 for the normal operation of the FIG. 1 arrangement, such as GR.303 or TR.303, can be used to implement the signaling needs of this method.

Still further, processor 11 must have the necessary information for making the call selection. For some of the decision schemas listed above, in connection with each of the calls that is included in the set of calls from which a call to be dropped is selected, processor 11 needs to know the call's type and duration. Knowledge of a call's duration is, again, inherent in the normal operation of switch 11, but the call's type—that is, whether the call is a data call or a voice call—is not. As for established calls, a call's type can be ascertained from one or more of the following call attributes: (a) calls that carry "modem tones" are data calls, and (b) calls that are marked by periods of relatively low power are voice calls (such low power periods result from breathing pauses and/or normal conversation patterns where one person speaks for some time while the other is quiet, and vice versa). In addition, a call's type can be sometimes ascertained—in the case of both established calls, and calls that are in the midst of their attempt period—from (c) the called number, and (d) the calling number. Information that imparts a call type based on calling and called number can be provided to processor 11, or can be derived by processor 11 from accumulated (historical) information. An example of (c) is a called number that is known to be a modem pool of an Internet Service Provider (ISP), or from a home office telephone line that is known to be used for computer communication. An example of (d) is a home line that is found to be used exclusively by a computer, or almost exclusively, from prior determinations of the call type that the particular calling party terminal carried.

The above-disclosed method can be also carried in processor 21 but, of course, processor 21 must have the same information, and the same control capabilities that are needed in processor 11 and that are described above. That is not a problem because processor 21 can easily keep track of the spare capacity on path 30, naturally keeps track of the spare capacity on paths 51 and 52, and inherently has the capability to drop calls. Also, call-type information can be obtained from processor 11, or compiled locally by processor 21. Of course, processor 21 must also have the capability to perform the necessary computations and decisions, but those capabilities are quite modest for this method.

In a modified version of the above, whenever the number of available channels in path 30 is less than K1 (or, alternatively, K2), switch 10 may be directed to first terminate an ongoing call and only then determine whether the incoming call attempt should be accepted. This provides some additional protection against overload due to near simultaneous call attempts. That is, this approach increases the probability that the spare capacity on path 30 will not fall below K1 but, on the down side, it may terminate a call that did not need to be terminated.

Apropos of the above statement that the call control mechanism works to maintain a high probability that a channel is always available, it is noted that the value of K1 is chosen to be significantly less than the capacity of shared transmission path 30 and that, normally, the number of available circuits will not drop below K1 because the above algorithm may drop a call whenever a call attempt is made and the capacity is less than K1 (i.e., drops a call in the sense that it drops a call in the midst of its communication period or a call in the midst of an attempt period). However, since it takes time to carry out the above-described decision process, it is possible that other call attempts will arrive before the decision process completes. In such a case, the number of unoccupied circuits may drop to a value below K1. When K1 is chosen to be significantly less than the capacity of shared transmission path 30, that possibility is extremely remote, but theoretically possible.

It should be noted that the above discloses an approach where, effectively, there is a serial connection of communication elements that is interposed between a collection of terminals and a switch; for example, path 51, HET 20, path 30. As described, path 51 is a shared resource that can be overloaded, and path 30 is a shared resource that can be overloaded. Without loss of generality it can be assumed that the resources of HET 20 cannot be overloaded. In such a case, with respect to possible overload conditions, it can be said that the described example comprises two shared overloadable resource arrangements, where a shared overloadable resource (SOR), or an overloadable resource (for short), is a resource that, when employed with respect to a call, has an resource element occupied for the duration of the call, such as a communication channel. Arrangement 1 includes $SOR_1^{30}$, which is the first member of the arrangement—that being path 30, and $SOR_1^{51}$, which is the second member of the arrangement—that being path 51. Arrangement 2 includes $SOR_2^{30}$, which is the first member of the arrangement—that being path 30, and $SOR_2^{52}$, which is the second member of the arrangement—that being path 52. Path 30 has $Q^{30}$ resource elements, path 51 has $Q^{51}$ resource elements, and path 52 has $Q^{52}$ resource elements. Thus, a call from terminal 45, which connects to switch 10 over the first arrangement, might occupy resource element $SOR_1^{30}(q)$, where q=1,2, . . . or $Q^{30}$, for example q=12, and resource element $SOR_1^{51}(q)$, where q=1, 2, . . . or $Q^{51}$, for example q=7. Of course, the principles of this method apply to arrangements that contain a smaller number, or a larger number, of serially connected SORs. It should also be realized that other elements, such as HET 20 could constitute an SOR by virtue of the fact that processor 21 may be placed in overload, and other components within HET 20 may also be statistically multiplexed.

The above disclosure focuses on the elements that are coupled to near-end office 10 and that use the near-end office as a gateway to the telecommunications network. However, the principles disclosed herein are applicable to elements within the network as well. Consider, for example, that end office 10 is connected via a trunk group to a particular toll or tandem switch. If the trunk group is nearly full (or in overload), beneficial result are achieved by engaging a process that, in response to a need to place an additional call on that trunk group, considers whether to drop an existing call that is serviced by that trunk group. Either near-end office 10 or the toll/tandem office can do the selective dropping but, normally, it would be preferable for the end offices to do this, for reasons of load and processing capability of the processors within the near-end office on the one hand, and the toll/tandem office on the other. A reasonable criterion for a call to be terminated is that it goes through a relatively large number of hops and therefore uses an unusually large amount of network resources. Dropping such a call is useful because by dropping a single call several other calls may be allowed to proceed.

The same sort of logic can be applied between toll switches. Currently, for example, the AT&T toll network uses an algorithm called Real Time Network Routing (RTNR) that allows calls to be one or two hop. Approximately 5% of the links are reserved for one-hop calls because it was found that, without some reservation for one-hop calls, the network could become stable with almost all calls being two-hop calls, and this severely restricts network capacity. Employing the principles disclosed herein, however, no reservations are needed because one can drop the two-hop calls when necessitated by network load conditions. Thus, a very heavily loaded network would rapidly migrate toward all one-hop calls, yielding maximum call handling capability. In short, the method disclosed herein works better for all network load conditions. It may be noted that one could also drop calls based on multiple hops (i.e., more than two), and on expected long holding times; for example, calls to 800 numbers that normally have long queues of people waiting to talk to a representative are calls with expected long holding times.

Method II—Traffic Management Through Resource Reservation Based on Call Type

This method focuses on the type of the calls that are carried by the shared overloadable resources and, more particularly, focuses on retaining or dropping calls based on priority notions related to the types of calls under consideration, in an effort to insure that at least a certain, predetermined number of channels are reserved for use in connection with a certain type, or types, of communication. In the illustrative embodiment disclosed herein, calls are divided into two classes of calls: voice and data, and the reservation is for a certain number of voice calls. More specifically, for the illustrative embodiment of this method, which is disclosed below for the FIG. 1 network arrangement, the method reserves $K_{30}$ channels for voice communication on path 30, $K_{51}$ channels for voice communication on path 51, and $K_{52}$ channels for voice communication on path 52.

While this method can be carried out in switch 10, the following discussion centers on the practice of this method by processor 21 within HET 20. One embodiment of this method is depicted in FIG. 3, but it should be realized that the specific order of steps in this method can be changes, and that the particular flow chart shown in FIG. 3 is merely illustrative.

Figure 3:
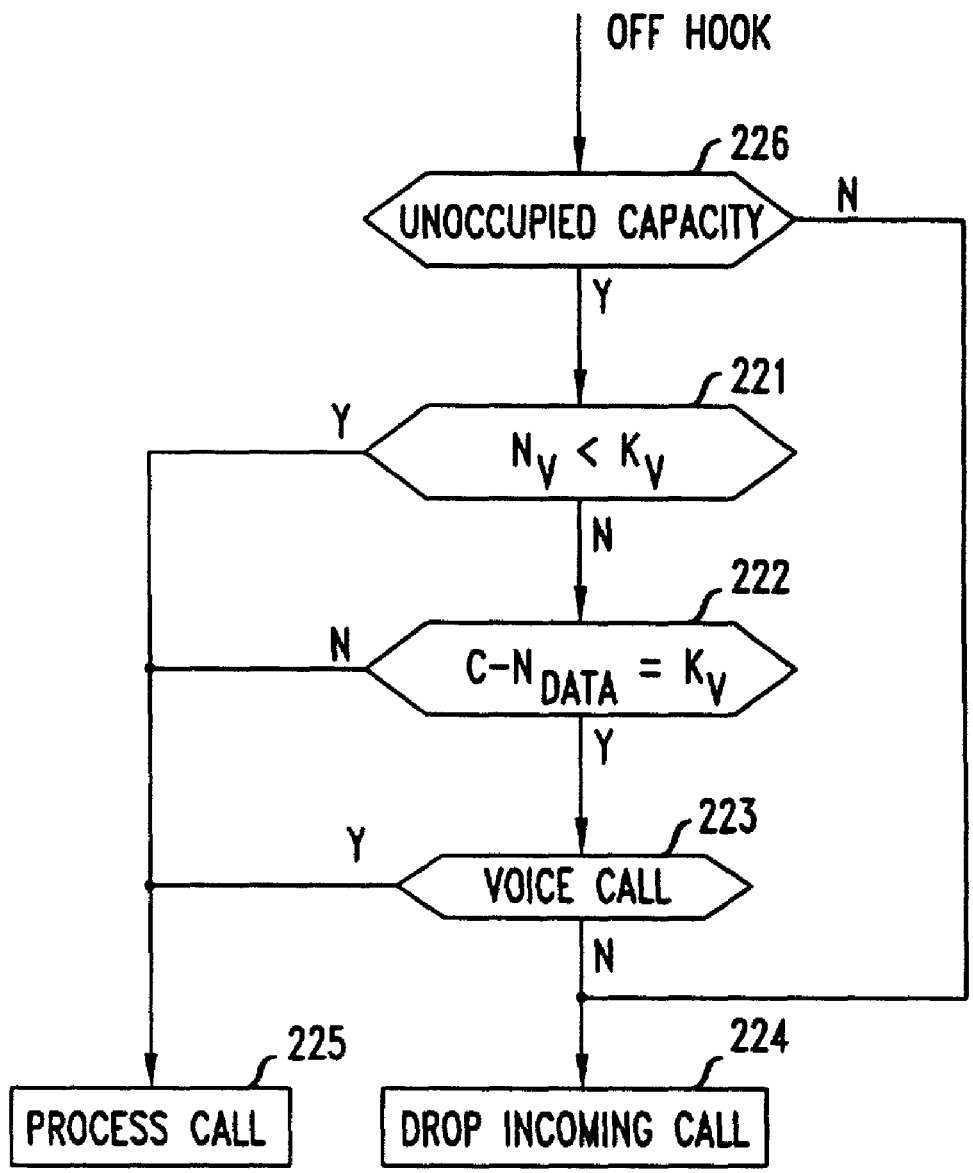
FIG. 3 presents a flow diagram of a method where a predetermined number of channels are reserved in the FIG. 1 arrangement for real-time communication.

The FIG. 3 method is carried out seriatim for each SOR in the serial connection of the SORs in the FIG. 1 arrangement that is relevant to the terminal that went "off-hook" and seeks to establish a connection. For example, when telephone 45 seeks a connection, the available, unoccupied, capacity on path 51 is assessed, and if the assessment does not result in a call being dropped, the available, unoccupied, capacity on path 30 is assessed.

Turning attention to the FIG. 3 embodiment, when processor 21 determines that a downstream terminal on one of the downstream paths went off-hook, for example, terminal 45 on downstream path 51, control passes to step 226, which determines whether the unoccupied capacity exists on each of the links that lead to switch 10. In the illustrative example of FIG. 3, when unoccupied capacity does not exist, control passes to step 224, where the incoming call is dropped. When unoccupied capacity is found to exist, control passes to step 221, which determines whether, on any of the shared overloadable resources that need to be employed to reach switch 10 (i.e., paths 51 and 30), the number of voice calls that the path already services a number of voice call, N that is less than the number of voice calls that are reserved for the path, $K_V$. When that is the case, no reserving of capacity is necessary and, accordingly, control passes to step 225, which processes the call. When that is not the case, control passes to step 222 to determine whether the number of data calls is already at its maximum; that is, at one of the shared overloadable resources the capacity of the path, minus the capacity reserved for voice calls equals the number of established data calls. When that is not the case, control passes to step 225. When that is the case, it is known that only voice calls may be permitted. Accordingly, control passes to step 223, which determines whether the call sought to be established is a voice call. When step 223 determines that the call sought to be established is a voice call, control passes to step 225. Otherwise, control passes to step 224, which drops the call that is sought to be established.

Another embodiment of this invention does not simply drop the incoming, sought to be established, call when step 226 determined that unoccupied capacity does not exits, which means that one or more of the serially connected overloadable resources between the terminal that wishes to be connected to, say, switch 10, is fully occupied. Rather, in such other embodiment, higher priority calls, for example, voice calls, can be allowed to be established but, of course, at a cost of some lower priority established call, for example, a data call, being dropped. This implies that the terminal seeking connection at least is made known to the apparatus that carries out this method. To get an even better indication regarding whether the terminal is seeking to establish a voice connection of a data connection can be obtained if a dial tone can be applied to the terminal that seeks to establish a connection, and the terminal outputs the called number digits that can be analyzed. It should be noted, however, that precisely how the disclosed method determines whether the call sought to be established is a voice call of a data call is not critical and does not form a part of this invention.

As indicated above, the disclosed method II, which incorporates all the teachings of method I, can be carried out in processor 11 as well as in processor 21, because all information that is known to processor 21 is also known, or can be provided to, processor 111; and all necessary controls that are available to processor 21 are also available to processor 11, directly or indirectly. The method carried out in processor 11 is only slightly different from the method carried out in processor 21.

While the above employs an illustrative embodiment for presenting method II, it should be understood that various modifications could be made without departing from the spirit and scope of the method. For example, more than two classes of calls can be considered; such as high priority voice calls, high priority data calls, normal (non-high priority) voice calls, and normal data calls. Also, it should be realized that a different order of steps can be taken, without departing from the spirit and scope of this invention. For example, following a determination that unoccupied capacity exits, the first test might be to determine whether the call that is sought to be established is a voice call. If so, it is processed. Otherwise, the call is processed only if the number of established data calls is less that the maximum number of allowed data calls, determined by considering the maximum number of calls that a path can service, less the number of calls reserved in that path for voice.

Method III—Control of Congestion Due to Redial Attempts

This method focuses on overload conditions resulting, at least in part, from repeated redialing. The basic idea is that if a particular telephone line redials a previously busy number within a short period of time, the chances are good that the number will be found to be still busy.

Figure 4:
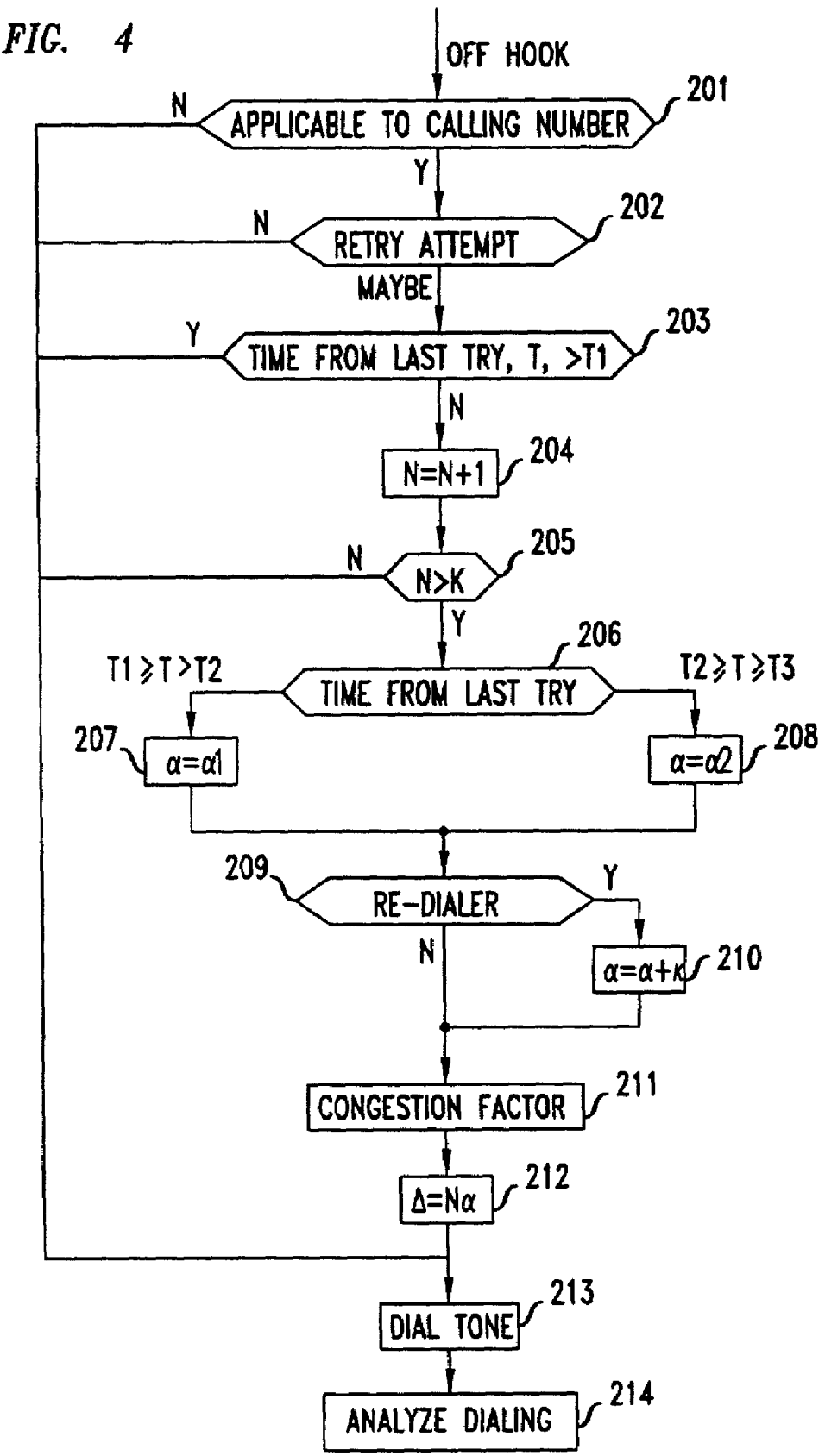
FIG. 4 presents a flow diagram of a method for delaying dial tone to terminals with an excessive number redial attempts.

One embodiment of this method is illustrated in FIG. 4. As with the methods disclosed above, this method can be carried out in processor 11 (encompassing all terminals that are connected to switch 10) as well as in processor 21 (encompassing all downstream terminals). An illustrative processor 11 embodiment is depicted in FIG. 4.

When an off-hook condition is detected from a terminal, control is asserted by step 201, which identifies the calling number of the terminal that went off-hook and determines, by reference to a database file in switch 10, whether the calling number is found in a set of calling numbers that have been excluded from experiencing delays. The calling numbers in such a file might correspond to very important persons, to people who pay a premium for their service, to telephones of emergency services, etc. The same database look-up optionally obtains information about whether the off-hook terminal has employed an automatic re-dialer in the past, and about the last time that the off-hook terminal attempted to get a dial tone. Also, information may be optionally retrieved as to whether the last time the terminal dialed resulted in an established call; and if not, whether the failure was caused by a trunk busy condition, or a "called party busy" condition.

When step 201 determines that the calling number is not permitted to have its dial tone delayed, control passes to step 213, which provides a dial tone and accepts dialed digits. When step 201 determines that the calling number is permitted to have its dial tone delayed, control passes to step 202, which may optionally conclude that the off-hook terminal is not a retry, e.g., when the database look-up indicates that the last off-hook condition for this terminal resulted in a completed connection. If the attempt is a suspected retry, then control then passes to step 203, which determines, also from the database look-up, whether the time interval between the current attempt and the last attempt is greater than some preselected threshold, T1. An affirmative conclusion in step 203 is treated as a new call (though, in fact, it may be a redial attempt) and control passes to step 213. A negative conclusion in step 203 is treated as a possible redial attempt (though it is recognized that the off-hook terminal may desire to attempt establishing a call to a new called number). In such a case, control passes to step 204, which increments a "retry" counter. Control then passes to step 205, which compares the value of retry counter N to a preselected number, K—which corresponds to the number of retries that are permitted without an introduction of a dial tone delay. When N is less than or equal to K, control again passes to step 213; otherwise control passes to step 206.

Like step 203, step 206 evaluates the time interval between the current off-hook condition and the previous off-hook condition (assessing how long ago was the last dialing attempt), or the previous on-hook condition (assessing how long was the last "call"). When it is concluded that the time interval is less than or equal to T1 but greater than T2 (where T2 is less than T1), step 206 concludes that the off-hook condition corresponds to a simple redial attempt. Thereupon, control passes to step 207, which sets variable a to a first value, $\alpha 1$, and then proceeds to step 209. When the time interval is less than or equal to T2, step 206 concludes that the off-hook condition also corresponds to a redial attempt, but by a particularly anxious terminal that is likely to attempt redialing very often. Responsively, control passes to step 208, which sets a to a value, $\alpha 2$, that is larger than $\alpha 1$ (imposing a longer delay), and then proceeds to step 209.

Step 209 determines from the database look up whether the off-hook terminal used a re-dialer in its last attempt. When that is the case, step 210 increases the value of ax and passes control to step 211. The value of a is increased in order to lengthen the dial tone delay, because it is expected that terminals that use re-dialer are likely to repeat redialing attempts very often, if given a chance. As an aside, use of a re-dialer is identified through analysis of the duration of the dialing sequence and the uniformity of its timing.

Step 211 introduces a congestion factor. Illustratively, it multiplies α by (F1·F2·F3), where F1 corresponds to a trunk busy condition, F2 corresponds to "called party busy" condition, and F3 corresponds to the general congestion level in switch 20. For example, F1=1.2 when the last attempt was unsuccessful due to a trunk busy condition, and 1 otherwise; F2=1.5 when the last attempt was unsuccessful due to a "called party busy," and 1 otherwise; and F3 starts at a value of 1 when switch 10 is lightly loaded, and increases with the load of switch 10.

Following step 211, control passes to step 212, which calculates a dial tone delay value by multiplying N by α, and imposes the calculated delay before it passes control to step 213. As indicated above, step 213 provides a dial tone to the terminal that went off-hook. Lastly, following step 213, information is collected about the dialing attempt and its consequences in step 214, and that information is stored for the aforementioned database look-ups.

It may be noted that various other criteria can be added to the process illustrated in FIG. 4. For example, in the collection of information about attempted calls, the called party's number can be stored and used in the decisions regarding dialing. On the one side, retry attempts to emergency numbers may be excluded from any delays. On the other hand, retry attempts to heavily dialed numbers, such as radio call-in programs, of ISP modem banks, may be subjected to longer delays (larger values of α).

The above-disclosed method can be said to be partially blocking redial attempts. By imposing a delay on dial tone, the number of redial attempts is reduced simply by virtue of the delay, by virtue of an increased probability that the busy condition that causes the redial attempt has disappeared, and by encouraging some attempts to be given up entirely. Fewer redial attempts reduce the load on the communication channels of switch 10, and that is the salutary effect that is desired.

The above discloses a method that is carried out in processor 11, and this method is effective for all terminals that are connected to switch 10, such as terminals 41 and 42, as well as HET 20. In some embodiments, it may be desirable to perform this method in processor 21 in order to obtain the further benefit of blocking some call attempts from even reaching path 30. A further benefit accrues from include dial tone generating means within HET 20. The method carried out in processor 21 is basically the same as the method depicted in FIG. 4. It should be noted that the various functions disclosed in connection with FIG. 4 are illustrative, and that other functions can be used with equally good results.

As indicated above, the above disclosure focuses on the elements that are coupled to near-end office 10 and that use the near-end office as a gateway to the telecommunications network. However, the principles disclosed herein are applicable to elements within the network as well. Consider, for example, the network switches that are traversed from a calling number to a called number. From the common signaling channel (e.g., Signaling System 7) these switches know the calling number and the called number and when the trunks that need to be employed to form the connection between the calling and called numbers are heavily loaded, the switches can choose to delay providing the necessary path leg if the switches conclude that the call to be established is a redial attempt. This method can be carried out in each of the switches within the network (that are involved with a call), even if the end office isn't busy and therefore gave the customer a dial tone without any delay. Such an embodiment of the principles disclosed herein could prove useful in avoiding a waste of resources when certain 800 numbers that are nearly always busy are called.

Method IV—Queue Management Scheme for Dial Tone Delays

Method III above discloses an approach for controlling congestion that arises from repeated redialing, where the method imposes a delay on the provision of a dial tone to the terminal that repeatedly redials, as a way for protecting OSRs from congestion (such as path 30, paths 51 and 52, and processors 11 and 21). Actually, repeated redialing attempts can impose an undue burden on the means that provides dial tone to terminals and detects dialed numbers, because such means are also an overloadable shared resource. This condition is well known in the central office art. If all such means are occupied, when an off-hook condition is detected by a central office, an indication of the off-hook line is placed into a queue, and as soon as a dial tone generator/dialed number detector becomes available, an indication of an off-hook line is extracted from the queue and the available generator is coupled to the line specified by the indication extracted from the queue.

When the central office switch is heavily loaded with call attempts, an available dial tone generator cannot be found instantly and, consequently, dial tone delays are experienced; i.e., the queue contains a number of off-hook line indications, corresponding to lines that need to receive a dial tone. What has been found is that placing the calling numbers in a First In First Out (FIFO) queue results in very poor performance under high load conditions, and that a Last In First Out (LIFO) queue results in better performance. Consequently, the central office art employs LIFO queues in near-end switching offices.

Unlike the dial tone delays of central offices, which arises simply from the inability of central office dialing generators and dialed number detectors to keep up with demand, method III discloses a process by which a delay is imposed on the provision of a dial tone to terminals that are repeatedly retrying to establish a call. Moreover, the imposed delay is not uniform, and there are numerous factors that affect the length of the delay. Consequently, the lengths of the delays that method III seeks to impose can be quite varied.

In accord with the principles of this method, the durations of dial tone delays that are imposed on repeated redial attempts are quantized to a limited number of different delays. Implementation of the delays in such embodiments can take the form of separate queues for each one of the different delays, as shown, for example, in FIG. 5, which is illustrated for step 213 of a method III embodiment that is carried out in processor 11.

Figure 5:
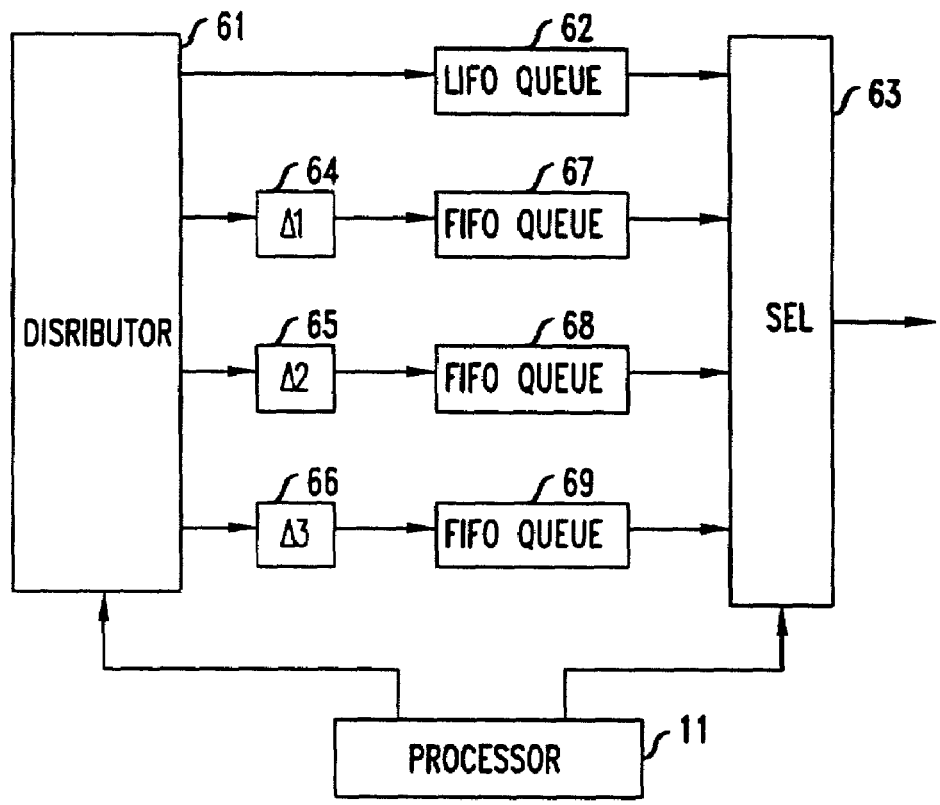
FIG. 5 presents a structure useful for implementing the FIG. 4 process.

In FIG. 5, indication of the terminal that wishes to receive a dial tone (line ID) is applied to distributor 61, where it is routed based the value of delay, D, that is computed in step 212. Specifically,

- a line ID that is to receive no delay is routed to queue 62;
- a line ID that is to receive a small delay (for example, between 0 and 0.4 seconds) is routed to delay element 64 that, after a delay of 0.4 seconds outputs the line ID to queue 67;
- a line ID that is to receive a longer delay (for example, greater than 0.4 second, and up to 1 second) is routed to delay element 65 that, after a delay of 1 second outputs the line ID to queue 68; and
- a line ID that is to receive a still longer delay (for example, greater than 1) is routed to delay element 65 that, after a delay of, for example, 3 seconds outputs the line ID to queue 69.

We have discovered that queue 62, which is associated with providing zero delay, just like conventional dial tone queues of central office switches is preferably a LIFO queue. However, all of the other queues (67–69), which provide an imposed delay, are preferably FIFO queues.

Lastly, the outputs of queues 62, 67, 68, and 69 are applied to selector 63 that, under control of processor 11 selects the output of one of the queues for pairing up with an available dial tone generator and dialed number detector. The selection schema for element 63 can vary, and one such schema selects the output of queue 62 whenever that queue is not empty, then selects the output of queue 67 whenever that queue is not empty, then selects the output of queue 68 whenever that queue is not empty, and so forth. Various other weighted polling schemes may be implemented, and these can be devised by one skilled in the art.

Method V—Enhanced Telephony Signaling

As indicated above, it is theoretically possible for all inactive downstream terminals to go off-hook almost simultaneously. This can result in no channels being available even for a determination as to whether one of the off-hook terminals wishes to make an emergency call. The method disclosed below overcomes this problem with an enhanced arrangement that provides signaling channels over and above the conventional, out-of-band signaling channels that carry signals in accordance with industry standards (e.g., TR303, GR303, or TR8). An out-of-band signaling channel, for purposes of this disclosure, is a channel that does not carry what is commonly referred to as audible signals. Examples of the latter are dial tone, voice, DTMF signals. The additional signaling channels, which are not out-of-band because they may carry audible signaling, are created from one of more communication channels that in the arrangements described earlier were employed for communication between, for example, terminal 46, and terminal 42. For convenience, these additional signaling channels are referred to herein as enhanced signaling channels. Because the enhanced signaling channels do not require the bandwidth that is available in these one or more communication channels that are used to create the enhanced signaling channels, each such communication channel is divided into a plurality of subchannels—using, for example, time division multiplexing—to form the enhanced signaling channels.

In the instant illustrative disclosure, the enhanced telephony signaling is provided on the path between HET 20 and switch 10 in the FIG. 1 arrangement but, of course, it can be provided on other paths, such as on paths 51, or 52, or both. It is noted that the FIG. 1 arrangement is an arrangement where a notion of a connection exists that requires a distinct call set-up, and this is one aspect that differentiates the FIG. 1 arrangement from some other networks, or arrangements.

Figure 6:
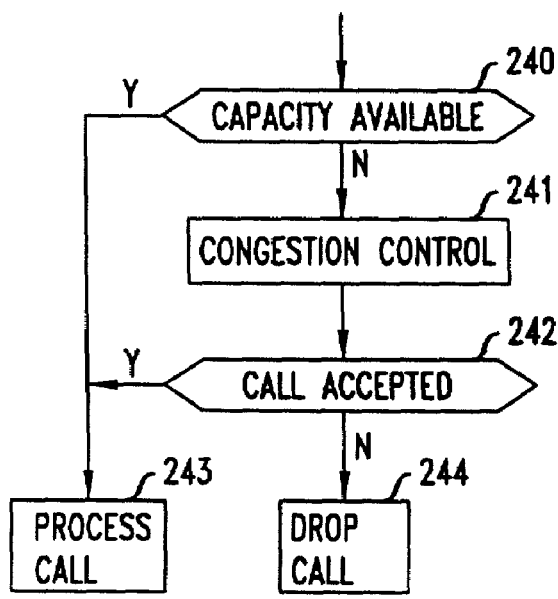
FIG. 6 presents a method for providing telecommunication services to terminals in the FIG. 1 arrangement, with dedicated signaling channels on path 30.

The general processing of this method, illustrated for an arrangement where control of access to switch 10 is primarily vested in processor 11, is depicted in FIG. 6. When a FIG. 1 terminal goes off-hook, for example, terminal 45, that condition is detected in HET 20 and communicated to processor 11 via one of the enhanced signaling channels between HET 20 and switch 10. Step 240 determines whether capacity exists on path 30 and on path 51, and if the determination is in the affirmative, control passes to step 243, where a communication channel is assigned in both paths, the off-hook terminal is coupled to switch 10 via the assigned channels, and the call attempt proceeds. If unoccupied capacity is not available, control passes to step 241 where processor 11 undertakes congestion control in accordance with any desired schema as, for example, disclosed above. The congestion control either drops an existing call or not, and passes control to step 242. Step 242 determines whether capacity now exists, and if so, control passes to step 243. Otherwise, control passes to step 244, which declines to service terminal 45.

In accordance with this method, therefore, dedicated signaling facilities are employed in the transmission medium between HET 20 and switch 10. The signaling passed through the enhanced signaling channels can employ any one of the known protocols, such as SS7 Common Channel Signaling protocol.

Figure 7:
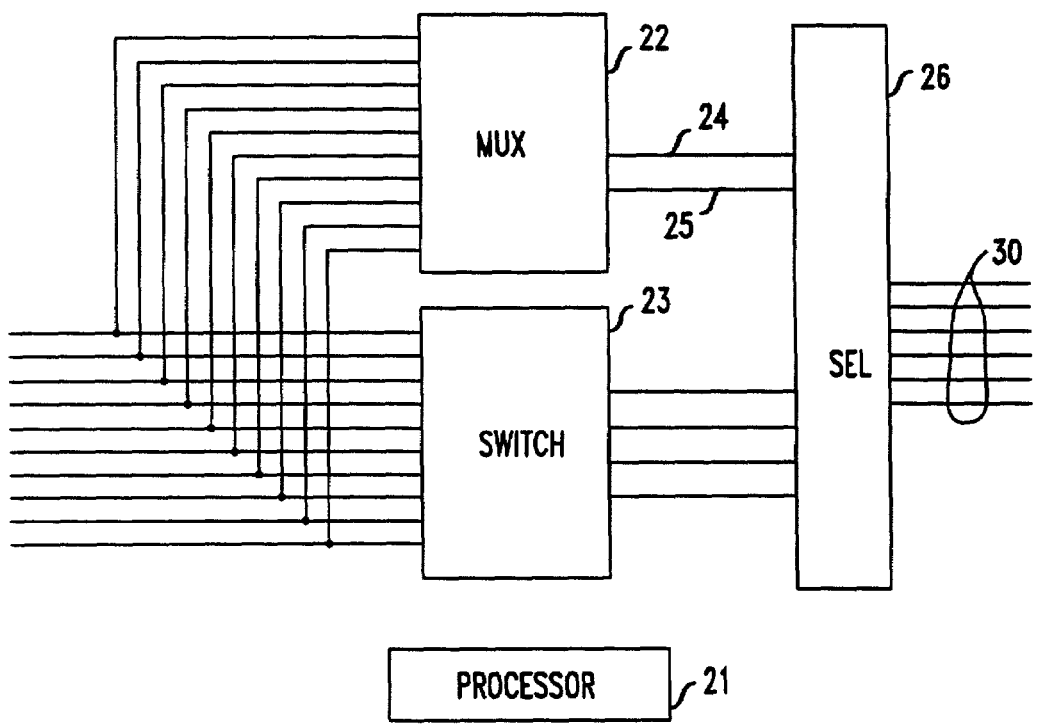
FIG. 7 presents block diagram of one embodiment for carrying out the FIG. 6 method.

FIG. 7 presents a block diagram showing the pertinent circuits of HET 20 that implement this method (for path 30), simplified to represent all channels in transmission path 30 as separate wires, and all downstream terminals that are connected to HET 20 via paths 51 and 52 also as separate wires. It should be also understood that while path 30 is depicted in FIG. 1 by a single line, and is depicted in FIG. 6 by a plurality of lines, the actual, physical embodiment of path 30 may comprise one or more distinct physical transmission elements (wires, cables, fibers). More specifically, embodiments exist where path 30 is a single physical transmission element over which information flows in time slots. One or more of the time slots are devoted to the out-of-band signaling and the remaining time slots are conventionally devoted to voice communication channels. In accord with the principles of this method, one or more of the communication channels are divided into subchannels that form the enhanced signaling channels.

Continuing with the description of FIG. 7, the downstream terminals are applied to multiplexer circuit 22 and to switch 23, both being under control of processor 21. Circuit 22 is for signaling, while switch 23 is for communication. Through a time-division multiplexing schema, circuit 22 establishes a transmission path between each downstream terminal and switch 10, via lines 24 and 25 (each representing a communication channel that is used for the enhanced signaling channels) and selector element 26, which is connected to the channels of transmission path 30.

It is noted, as an aside, that the number of channels in transmission path 30 (6 shown) is less than the number of downstream terminal lines coming to elements 22 and 23 (10 shown), to illustrate the concentration function that HET 20 performs. It should also be noted that the FIG. 6 can use fewer or more of the available channels for signaling purposes and that the use of the two channels (24 and 25) is merely illustrative. Indeed, the number of such signaling channels can be variable, controlled by processor 21 through operation of multiplexer 22 and selector 26, to accommodate the load that is offered to HET 20. Switch 23 routes accepted call requests of the downstream terminals to switch 10, also via selector element 26.

In operation, when a downstream terminal goes off-hook, that information is passed to switch 10 via an enhanced signaling channel of multiplexer 22 and extended through selector element 26. Switch 10 provides a dial tone to the downstream terminal via the same timeslot, and the downstream terminal proceeds to output dialing signals. Those signals are applied to switch 10, again through the same time slot, and in response thereto, switch 10 proceeds pursuant to FIG. 6, as disclosed above. The congestion control—should it be necessary—can be implemented by processor 11 or by processor 21, for example in accordance with some of the methods disclosed above. If the call attempt of the off-hook downstream terminal is accepted, switch 23 couples the downstream terminal to a channel on path 30 to provide a communication channel, and the call proceeds.

Figure 8:
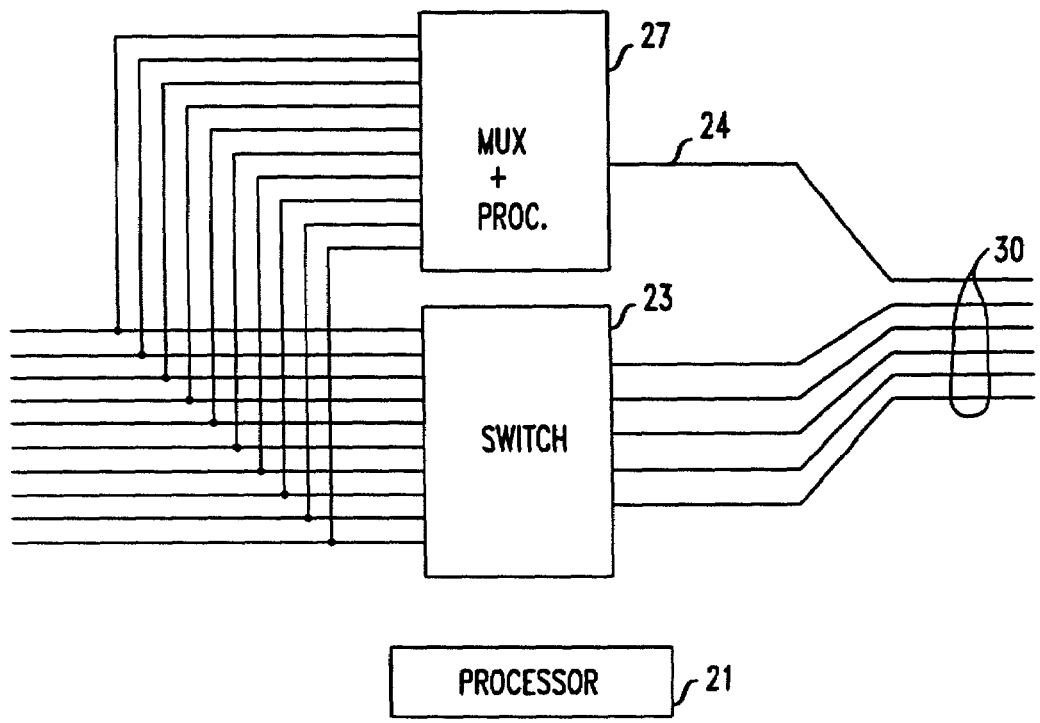
FIG. 8 presents block diagram of another embodiment for carrying out the FIG. 6 method.

Another embodiment, depicted in FIG. 8, has multiplexer 22 replaced with element 27, element 26 is eliminated, only one communication channel of transmission path 30 ("wire" 24) is employed for the enhanced signaling channels between element 27 and switch 10, and switch 23 is connected directly to the remaining communication channels of transmission path 30. Element 27 implements the multiplexing function of element 22, and also includes a processing capability. In this embodiment, the FIG. 6 method is carried out primarily in processor 21. Thus, element 27 generates and provides all of the signaling that switch 10 normally sends to downstream terminals (such as dial tone, dialed digits detection, busy signal, "fast" busy), and analyzes all of the signaling that the downstream terminals might wish to send to switch 10. The connection between element 27 and switch 10 thus carries only the ultimate information that must be communicated between switch 10 and the downstream terminals (advantageously in digital form) and, therefore, the connection between element 27 and switch 10 needs truly little bandwidth. It is for this reason that only one channel of transmission path 30 is needed between element 27 and switch 10.

The above disclosures are couched in terms of a switched network, where calls have associated call set-ups. However, the disclosed principles are not limited to the switched network. In fact, these principles are applicable to packet networks that employ the notion of a connection, and admission control processes, such as in ATM networks. In such a network, a "busy" can mean a non-responding server, or one that is server busy and responds very slowly. To identify this condition, the end router has to snoop on packets flowing from the server to find the server's busy condition, and would need to use a timer to determine when the server is not responding. The end-router could communicate the busy condition of the server to the originating router, and the originating router could then delay admission, which is the equivalent of delaying dial tone, of subsequent, closely spaced, attempts to the same server. Additionally, the notion of dropping a data call, can be extended to not only doing a full disconnect, but also to suspending the flow of packets for, perhaps, a second to allow other connections to proceed. The idea of a large hop count still applies. The product of the hop count multiplied by the bandwidth required is a figure of how much network resource is being used, and connections where this product is very high are prime candidates for being dropped or suspended. This, again, will cause an overloaded network to tend toward short hop calls, thereby mitigating the network overload.

The invention claimed is:

1. A call set-up method, in an arrangement that includes a plurality of terminals that are connected to a network via a serial connection of at least one transmission medium comprising a plurality of communication channels, said channels being a shared overloadable resource, and where, in addition to at least one out-of-band signaling channel at least one of the communication channels is divided into a plurality of enhanced signaling channels, the method comprising:
    in response to one of said terminals requesting a call set-up, employing said enhanced signaling channels to communicate call set-up information; and
    in response to receiving said call set-up information, executing a congestion control process that results in (a) setting up a call for said one of said terminals, when conditions on said communication channels permit, and (b) dropping an established call from one of said communication channels in order to create conditions that permit setting up said call by said step of setting up.

2. The method of claim 1 where said enhanced signaling channels carry at least some audible signals in said step of employing.

3. A method for providing telecommunication service, in an arrangement including a plurality of terminals that are coupled to a node, which node is coupled to apparatus via a multi-communication-channel transmission medium, comprising the steps of:
    in response to an off-hook condition assumed by one of said terminals, it being a seeking terminal, detected by said node, passing off-hook information to said apparatus over a signaling channel that belongs to a plurality of enhanced signaling channels;
    determining whether unoccupied capacity exists on communication channels between said apparatus and said seeking terminal that belong to said multi-communication-channel transmission medium;
    when said step of determining concludes that unoccupied capacity exists, assigning one or more unoccupied communication channels to form a communication path between said seeking terminal and said apparatus, and proceeding with provision of said telecommunication service to said seeking terminal;
    when said step of determining concludes that unoccupied capacity does not exist, undertaking a congestion control process to either drop an existing connection to free one or more communications channels that can form a communications path between said seeking terminal and said apparatus, or declines to provide said telecommunication service; and
    when said step of determining frees said one or more communication channels that can form a communications path between said seeking terminal and said apparatus, employing said one or more communication channels to proceed with provision of said telecommunication service to said seeking terminal.

4. The method of claim 3 where, in said step of a assigning one or more unoccupied channels of said multi-communication-channel transmission medium and proceeding with provision of said telecommunication service, signaling between said seeking terminal and said apparatus that is associated with said provision flows through said signaling channel.

5. The method of claim 3 where said congestion control process provides a dial tone to said seeking terminal, receives dialed digits from said seeking terminal and reaches a conclusion as to whether to drop a call based on said received dialed digits.

6. The method of claim 5 where said dial tone is provided by said apparatus, via said signaling channel.

7. The method of claim 3, carried out in said apparatus.

8. The method of claim 3 where said congestion control process comprises:
    a first step, of assessing whether identity of said seeking terminal suffices to reach a conclusion to drop a call,
    when said assessing determines that said identity of said seeking terminal is insufficient, a second step of providing a dial tone to said seeking terminal, receiving dialed digits from said seeking terminal, and reaching a conclusion as to whether to drop a call based on said received dialed digits; and
    when a conclusion is reached by said first step or said second step to drop a call, a third step of dropping an existing connection in accordance with a preselected process to free one or more channels that can form said communications path between said seeking terminal and said apparatus.

9. The method of claim 8 where signal communications in said second step are carried out over said signaling channel.

10. The method of claim 3 where said plurality of channels that are dedicated to signaling are derived from a preselected number of communication channels belonging to said multi-communication-channel transmission medium.

11. The method of claim 3 where said plurality of channels that are dedicated to signaling are derived from a preselected number of subdivided communication channels belonging to said multi-communication-channel transmission medium.

12. The method of claim 3 where number of signaling channels in said plurality of channels that are dedicated to signaling is variable.

13. The method of claim 12 where said number of signaling channels in said plurality of channels is a function of load.

14. A method for providing telecommunication service, in an arrangement including a plurality of terminals that are coupled to a node, which node is coupled to apparatus via a multi-communication-channel transmission medium, comprising the steps of:
(a) in response to an off-hook condition assumed by one of said terminals, it being a seeking terminal, determining whether unoccupied capacity exists on communication channels between said apparatus and said seeking terminal that belong to said multi-communication-channel transmission medium;
(b) when said step of determining concludes that unoccupied capacity exists, assigning unoccupied one or more channels of said multi-communication-channel transmission medium to form a communication path between said seeking terminal and said apparatus, and proceeding with provision of said telecommunication service to said seeking terminal, where signaling that is associated with said provision flows through a signaling channel that belongs to a plurality of channels that are dedicated to signaling;
(c) when said step of determining concludes that unoccupied capacity does not exist, undertaking a congestion control process to either drops an existing connection to free one or more channels that can form a communications path between said seeking terminal and said apparatus, or declines to provide said telecommunication service; and
(d) when said step of determining frees said one or more communication channels of said multi-communication-channel transmission medium that can form a communications path between said seeking terminal and said apparatus, employing said one or more communication channels to proceed with a process for providing of said telecommunication service to said seeking terminal, where signaling that is associated with said process for providing flows through a signaling channel.

15. The method of claim 14 where said signaling channel is in a path between said node and said apparatus.

16. The method of claim 14 where said signaling channel is in a path between said seeking terminal and said node.

17. The method of claim 14 where said signaling channel is in a path between said node and said apparatus and in a path between said seeking terminal and said node.

18. The method of claim 14, executed in said node.

19. The method of claim 14 where said proceeding with provision of said telecommunication service to said seeking terminal in step (b) comprises said node providing a dial tone to said seeking terminal and receiving dialed digits from said seeking terminal.

20. The method of claim 19 where said node generates said dial tone within said node.

21. The method of claim 20 where said dial tone provided to said node to said seeking apparatus is over said signaling channel.

22. The method of claim 19 where said node provides said dial tone to said seeking apparatus by transferring a dial tone received by said node from said apparatus.

23. The method of claim 22 where said dial tone received by said node from said apparatus is received via said signaling channel.

24. The method of claim 22 where said dial tone received by said node from said apparatus is received via a portion of said signaling channel that exists in path between said node and said apparatus, and is provided to said seeking apparatus by said node via a portion of said signaling channel that exists in path between said node and said seeking terminal.

25. The method of claim 19 where dialed digits are received and stored in said node prior to said node
(i) indicating to said apparatus of an off hook condition,
(ii) receiving a dial tone from said apparatus, and
(iii) providing to said apparatus the stored dialed digits.

26. The method of claim 25 where steps (i), (ii), and (iii) employ said signaling channel.

27. The method of claim 25 where steps (i), (ii), and (iii) employ said a portion of said signaling channel that is in path between said node and said apparatus.

28. The method of claim 25 where said signaling channel is in path between said seeking apparatus and said node, and steps (i), (ii), and (iii) employ a communication channel.

29. An arrangement comprising:
a plurality of terminals that are coupled to an HET terminal;
a central office switch;
a path between said HET terminal and said central office that comprises a first plurality of communication channels, and a second plurality of dedicated signaling channels; and wherein said second plurality is driving from subdividing each of a selected number of said communication channels into two or more signaling channels.

30. The arrangement of claim 29 where said selected number is variable.

31. An arrangement comprising:
a first element serving a plurality of terminals;
a second element coupled to a communication network;
one or more out-of-band signaling channels between said first element and said second element;
a plurality of communication channels between said first element and said second element, each of said communication channels providing a given bandwidth;
one or more groups of enhanced signaling channels, where each of said groups is formed from one of said communication channels and containing a plurality of said enhanced signaling channels used for call set-ups between said first element and said second element; and wherein said enhance signaling channels is deriving from dividing each of a selected number of the communication channels into two or more signaling channels.

32. The arrangement of claim 31 where said first element is a concentrating element.

33. The arrangement of claim 32 where said plurality of terminals is greater in number than number of said communication channels.

34. The arrangement of claim 32 where said out-of-band signaling channels, said plurality of communication channels, and said groups of enhanced signaling channels share a single physical transmission medium.

35. The arrangement of claim 32 where said out-of-band signaling channels, said plurality of communication channels, and said groups of enhanced signaling channels are time-division multiplexed onto a single physical transmission medium.

* * * * *